United States Patent
Lemberg et al.

(10) Patent No.: US 12,126,547 B2
(45) Date of Patent: Oct. 22, 2024

(54) METHOD AND SYSTEM FOR RESOURCE GOVERNANCE IN A MULTI-TENANT SYSTEM

(71) Applicant: Microsoft Technology Licensing, LLC, Redmond, WA (US)

(72) Inventors: Rachel Lemberg, Herzliya (IL); Raphael Fettaya, Herzliya (IL); Mohamad Salamah, Herzliya (IL); Yaniv Lavi, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 484 days.

(21) Appl. No.: 17/362,635

(22) Filed: Jun. 29, 2021

(65) Prior Publication Data
US 2022/0417175 A1 Dec. 29, 2022

(51) Int. Cl.
| | |
|---|---|
| *H04L 47/83* | (2022.01) |
| *H04L 47/10* | (2022.01) |
| *H04L 47/125* | (2022.01) |
| *H04L 47/762* | (2022.01) |
| *H04L 47/78* | (2022.01) |

(52) U.S. Cl.
CPC ............ *H04L 47/83* (2022.05); *H04L 47/125* (2013.01); *H04L 47/29* (2013.01); *H04L 47/762* (2013.01); *H04L 47/781* (2013.01)

(58) Field of Classification Search
CPC ... H04L 47/83; H04L 47/125; H04L 41/0896; H04L 41/0895; H04L 41/147; H04L 41/40; H04L 43/0876; H04L 43/16; H04L 43/20; H04L 47/822; H04L 47/823; H04L 47/29; H04L 67/61; H04L 41/0894; H04L 41/149; H04L 45/08; H04L 67/1004; H04L 67/1025; H04L 67/1031; G06F 9/5083; G06F 9/505; G06F 3/0631; G06F 3/067; G06F 9/5077; H04W 24/04; H04W 84/18
See application file for complete search history.

(56) References Cited

U.S. PATENT DOCUMENTS

| | | | |
|---|---|---|---|
| 8,914,497 B1 | 12/2014 | Xiao et al. | |
| 10,432,551 B1 * | 10/2019 | Vosshall | H04L 47/783 |

(Continued)

OTHER PUBLICATIONS

"Multitenancy", Retrieved from: https://en.wikipedia.org/wiki/Multitenancy, Jan. 25, 2021, 4 Pages.

(Continued)

*Primary Examiner* — The Hy Nguyen

(57) ABSTRACT

Example aspects include techniques for implementing resource governance in multi-tenant environment. These techniques may include receiving a service request for a multi-tenant service from a client device, and predicting a resource utilization value (RUV) resulting from execution of the service request based on text of the service request, an amount of data associated with the client device at the multi-tenant service, and/or a temporal execution value. In addition, the techniques may include determining that the RUV is greater than a preconfigured threshold identifying an expensive request, and applying a load balancing strategy to the service request based on the RUV being greater than the preconfigured threshold.

20 Claims, 4 Drawing Sheets

(56) References Cited

U.S. PATENT DOCUMENTS

| | | | |
|---|---|---|---|
| 10,659,542 | B2 | 5/2020 | Ignatyev |
| 10,713,589 | B1* | 7/2020 | Zarandioon ............ G06N 20/00 |
| 10,726,009 | B2 | 7/2020 | Pal et al. |
| 10,749,814 | B2 | 8/2020 | Das et al. |
| 10,762,539 | B2 | 9/2020 | Murugesan et al. |
| 10,817,803 | B2 | 10/2020 | Garvey et al. |
| 10,831,789 | B2 | 11/2020 | Srinivasan et al. |
| 2005/0165617 | A1 | 7/2005 | Patterson et al. |
| 2018/0121410 | A1 | 5/2018 | Fregly et al. |
| 2019/0042322 | A1 | 2/2019 | Calhoun et al. |
| 2019/0325028 | A1* | 10/2019 | Palanichamy ...... G07F 17/3209 |
| 2019/0386889 | A1* | 12/2019 | Noorshams ............. H04L 67/10 |
| 2020/0082316 | A1 | 3/2020 | Megahed et al. |
| 2021/0044535 | A1 | 2/2021 | Ignatyev |
| 2021/0135983 | A1* | 5/2021 | Farnham ................ H04L 45/70 |

OTHER PUBLICATIONS

Li, et al., "Ease.ml: Towards Multi-tenant Resource Sharing for Machine Learning Workloads", In Proceedings of the VLDB Endowment, vol. 11, Issue 5, Aug. 2018, pp. 607-620.

Ross, et al., "Automatically Scaling Multi-Tenant Machine Learning", In Technical Disclosure Commons, Dec. 12, 2017, 35 Pages.

Wren, et al., "Log Analytics Tutorial", Retrieved from: https://docs.microsoft.com/en-us/azure/azure-monitor/logs/log-analytics-tutorial, Oct. 7, 2020, 11 Pages.

"International Search Report and Written Opinion Issued in PCT Application No. PCT/US22/029943", Mailed Date: Aug. 26, 2022, 10 Pages.

\* cited by examiner

METHOD AND SYSTEM FOR RESOURCE GOVERNANCE IN A MULTI-TENANT SYSTEM

BACKGROUND

A cloud computing environment may provide one or more resources as a service to customers over a network. In some examples, a cloud computing environment will implement a multi-tenant architecture that employs a shared set of resources to provide a service to the customers. As an example, a database as a service (DaaS) may provide database functionalities via a cloud computing environment to allow customers to make relational queries using resources shared amongst the customers. Furthermore, in some instances, one or more customer requests may consume an inordinate amount of the shared resources, e.g., expensive database queries. As a result, other requests and activity within the cloud computing environment may be negatively affected. For example, a service may suffer failure (e.g., service timeout, throttling, memory exception, etc.) and/or error (e.g., ingestion error). As another example, in response to an expensive request, a service may implement costly auto-scaling and/or generate noisy incident reporting.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include receiving a service request for a multi-tenant service from a client device, and predicting a resource utilization value (RUV) resulting from execution of the service request based on text of the service request, an amount of data associated with the client device at the multi-tenant service, and/or a temporal execution value. Further, the method may include determining that the RUV is greater than a preconfigured threshold identifying an expensive request, and applying a load balancing strategy to the service request based on the RUV being greater than the preconfigured threshold.

In another aspect, a device may include a memory storing instructions, and at least one processor coupled to the memory and to execute the instructions to: receive a service request for a multi-tenant service from a client device, predict a resource utilization value (RUV) resulting from execution of the service request based on text of the service request, an amount of data associated with the client device at the multi-tenant service, and/or a temporal execution value, determine that the RUV is greater than a preconfigured threshold identifying an expensive request, and apply a load balancing strategy to the service request based on the RUV being greater than the preconfigured threshold.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
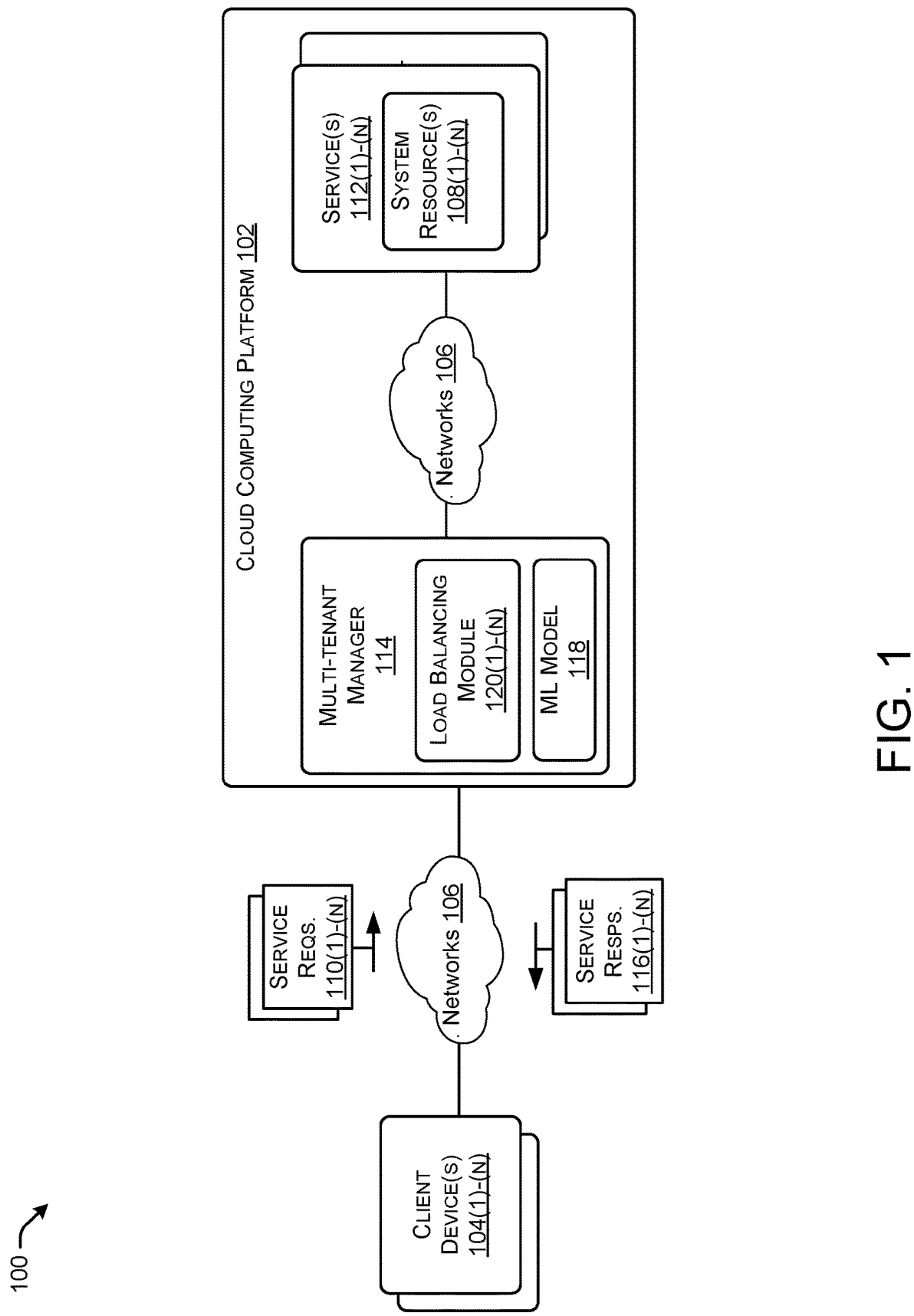
FIG. 1 is a diagram showing an example of a cloud computing system, in accordance with some aspects of the present disclosure

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing resource governance in a multi-tenant environment. In particular, aspects of the present disclosure provide a multi-tenant manager configured to predict a resource utilization value for a service request using a machine learning (ML) model, and apply a load balancing strategy to the database request based on the resource utilization value. Accordingly, for example, multi-tenant environment may employ the multi-tenant manager to provide to prevent and/or mitigate the negative effects of expensive service requests.

In accordance with some aspects of the present disclosure, a multi-tenant manager may determine a strategy for executing a service request based on a ML prediction of resource consumption resulting from execution of the service request. For example, a multi-tenant manager may receive a service request for a service from a client device associated with a tenant within a multi-tenant environment. In some aspects, the service request may be a database query over a DaaS storing database tables for a plurality of tenants. In some other aspects, the service request may be a data request for a cloud storage service. In yet still some other aspects, the service request may be a search request. Further, the multi-tenant manager may be configured to manage execution of the service request by the service within the multi-tenant environment. In particular, the multi-tenant manager may be configured to implement a resource governance technique to prevent, minimize, and/or mitigate execution of a service request that utilizes a quantity of resources within the multi-tenant environment that may degrade the reliability and/or performance of one or more services for clients.

In particular, the multi-tenant manager may employ a machine learning (ML) model to predict the resource utilization of the service request. In some aspects, the ML model may be a quantile gradient boost model or a natural language processing model employing transformers. Further, the ML models may be trained to generate worst case predictions, and applicable to the plurality of tenants within the multi-tenant environment as opposed to being finely focused on an individual tenant. As described in detail herein, the multi-tenant manager may determine whether to execute the service request and an appropriate time for executing the service request based on the predicted resource utilization. Accordingly, the systems, devices, and methods described herein provide techniques for employing resource utilization prediction to prevent, minimize, and/or mitigate service failure due to excessive resource utilization within a multi-tenant environment.

Illustrative Environment

FIG. 1 is a diagram showing an example of a cloud computing system 100, in accordance with some aspects of the present disclosure.

As illustrated in FIG. 1, the cloud computing system 100 may include a cloud computing platform 102, and a plurality of client devices 104(1)-(n). The cloud computing platform 102 may be a multi-tenant environment that provides the client devices 104(1)-(n) with distributed storage and access to software, services, files, and/or data via one or more network(s) 106. The network(s) 106 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the cloud computing platform 102, and the client devices 104(1)-(N)). In a multi-tenancy environment, one or more system resources 108 of the cloud computing platform 102 are shared among tenants but individual data associated with each tenant is logically separated. Some examples of the client devices 104(1)-(n) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. Further, in some aspects, a client device 104 may include one or more applications configured to interface with the cloud computing platform 102 and/or one or more cloud applications deployed on the cloud computing platform 102. The client devices 104(1)-(n) may be associated with customers (i.e. tenants) of the operator of the cloud computing platform 102 or end-users that are subscribers to services and/or applications of the customers that are hosted on the cloud computing platform 102 and provided by the customers to the end users via the cloud computing platform 102.

As illustrated in FIG. 1, the client devices 104(1)-(n) may transmit service requests 110(1)-(n) to one or more services 112(1)-(n) provided by the cloud computing platform 102. Some examples of a service 112 include infrastructure as a service (IaaS), platform as a service (PaaS), software as a service (SaaS), search engine as a service (SEaaS), database as a service (DaaS), storage as a service (STaaS), security as a service (SECaaS), big data as a service (BDaaS), a monitoring as a service (MaaS), logging as a service (LaaS), internet of things as a service (IOTaaS), identity as a service (IDaaS), analytics as a service (AaaS), function as a service (FaaS), and/or coding as a service (CaaS). Further, the system resources 108(1)-(n) may be reserved for use by the services 112(1)-(n). Some examples of the system resources 108(1)-(n) may include computing units, bandwidth, data storage, application gateways, software load balancers, memory, field programmable gate arrays (FPGAs), graphics processing units (GPUs), input-output (I/O) throughput, or data/instruction cache.

As described in detail herein, the cloud computing platform 102 may include a multi-tenant manager 114 configured to control access by the client devices 104(1)-(n) to the services 112(1)-(n). For example, the multi-tenant manager 114 may be configured to implement the multi-tenancy architecture within the cloud computing system 100 by managing execution of the service requests 110 over the system resources 108(1)-(n) associated with the client devices 104(1)-(n), and transmission of service responses 116(1)-(n) corresponding to the service requests 110(1)-(n) to the client devices 104(1)-(n). In addition, the multi-tenant manager 114 may be configured to apply one or more load balancing strategies to the service requests 110(1)-(n) to prevent service failure that may negatively degrade performance of the services 112(1)-(n) for the client devices 104(1)-(n) and/or result in costly auto-scaling to increase the capacity of the system resources 108(1)-(n) provisioned to a service 112 to perform the service requests 110(1)-(n).

In particular, the multi-tenant manager 114 may be configured to predict a resource utilization value (RUV) of a service request 110 received from the client device 104(1) according to a ML model 118, and perform the service request 110 based on the RUV and the applicable load balancing strategy. As used herein, a RUV may refer to an amount of at least one system resource that will be consumed by performance of a service request, the total amount of at least one system resource that will be consumed by performance of the service request with the currently executing service requests, or the likelihood that the service request will result in a timeout. As an example, the service 112(1) may be a DaaS, and the service request 110(1) may be a database query. As another example, the service 112(2) may be a STaaS, and the service request 110(1) may be a file request over cloud storage of the STaaS. As yet still another example, the service 112(3) may be a SEaaS, and the service request 110(1) may be a search request. Further, the ML model 118 may predict the RUV of the service request 110(1) based on one or more input parameters. In some aspects, the input parameters may be based on the search terms (i.e., query string) of the service request 110(1), an estimate of a data volume (e.g., the size of the database tables associated with the service request 110(1), a tenant workspace, and/or client device 104(1), the number of rows or records associated with the service request 110(1), a tenant workspace, and/or client device 104(1), an amount of data objects or structures associated with the service request 110(1), a tenant workspace, and/or client device 104(1), the total size of a multi-tenant database, the total amount of records, rows, objects, and/or data structures of a multi-tenant database, etc.), and/or a temporal execution value indicating a period of time over which the service request 110(1) is being executed. Some other examples of input parameters include the date and/or time of the service request 110(1), and the type of service request 110(1) (e.g., the type of database command).

In some aspects, the service request 110(1) may be denied if the RUV is greater than a preconfigured threshold representing service requests 110(1)-(n) that are deemed too expensive, such as but not limited to ten percent of a particular system resource 108(1). Further, if the RUV is greater than another preconfigured threshold, the service request 110(1) may be identified as an expensive request. In some aspects, in accordance with a first preconfigured strategy, the RUV may represent a prediction of the amount of a system resource 108(1) (e.g., a CPU) that will be consumed by performance of the service request 110(1). Further, a load balancing module 120 may determine the amount of expensive service requests 110 currently executing over the system resource 108(1) and compare the amount of expensive requests currently executing to a preconfigured threshold representing the maximum amount of expensive service requests 110 permitted to concurrently execute at service 112. If the amount of expensive requests currently executing is less than the preconfigured threshold, the load balancing module 120 may transmit the service request 110(1) to the service 112(1) for execution. Otherwise, the load balancing module 120 may add the service request 110(1) to a queue (e.g., a first in first out (FIFO) queue) to be transmitted to the service 112(1) for execution when the amount of expensive requests currently executing is less than the preconfigured threshold. Further, in some aspects, the load balancing module 120 may add the service request 110(1) to a queue when an amount of service requests 110 associated with the client device 104(1) that are identified as expensive is greater than a preconfigured threshold representing the maximum amount of expensive service requests 110 a single client device 104(1) may concurrently execute at a service 112(1).

In some other aspects, in accordance with a second preconfigured strategy, the RUV may represent a prediction of the total amount of the system resource 108(1) that will be consumed by performance of the service request 110(1) along with the currently executing service requests 110, and the load balancing module 120 may compare the RUV to a preconfigured threshold representing an unacceptable utilization percentage of the system resource 108(1). If RUV is less than the preconfigured threshold, the load balancing module 120 may transmit the service request 110(1) to the service 112(1) for execution. Otherwise, the load balancing module 120 may deny the service request 110(1) or add the service request 110(1) to a queue to be executed when the RUV is less than the preconfigured threshold. In some aspects, the preconfigured thresholds may correspond to a significant deviation from a baseline consumption of the system resource 108(1).

In some other aspects, in accordance with a third preconfigured strategy, the RUV may represent a prediction of the likelihood that the service request 110(1) will result in a timeout, and the load balancing module 120 may compare the RUV to a preconfigured threshold representing an unacceptable likelihood of timeout. If RUV is less than the preconfigured threshold, the load balancing module 120 may transmit the service request 110(1) to the service 112(1) for execution. Otherwise, the load balancing module 120 may deny the service request 110(1).

By predicting resource consumption prior to performance of a service request 110 and applying a load balancing strategy, the multi-tenant manager 114 may prevent failure of the service 112(1) that may negatively degrade system performance for the client devices 104(1)-(n) and/or result in costly auto-scaling to increase the capacity of service 112(1) by adding additional system resources 108(1)-(n) to the service 112(1).

Figure 2:
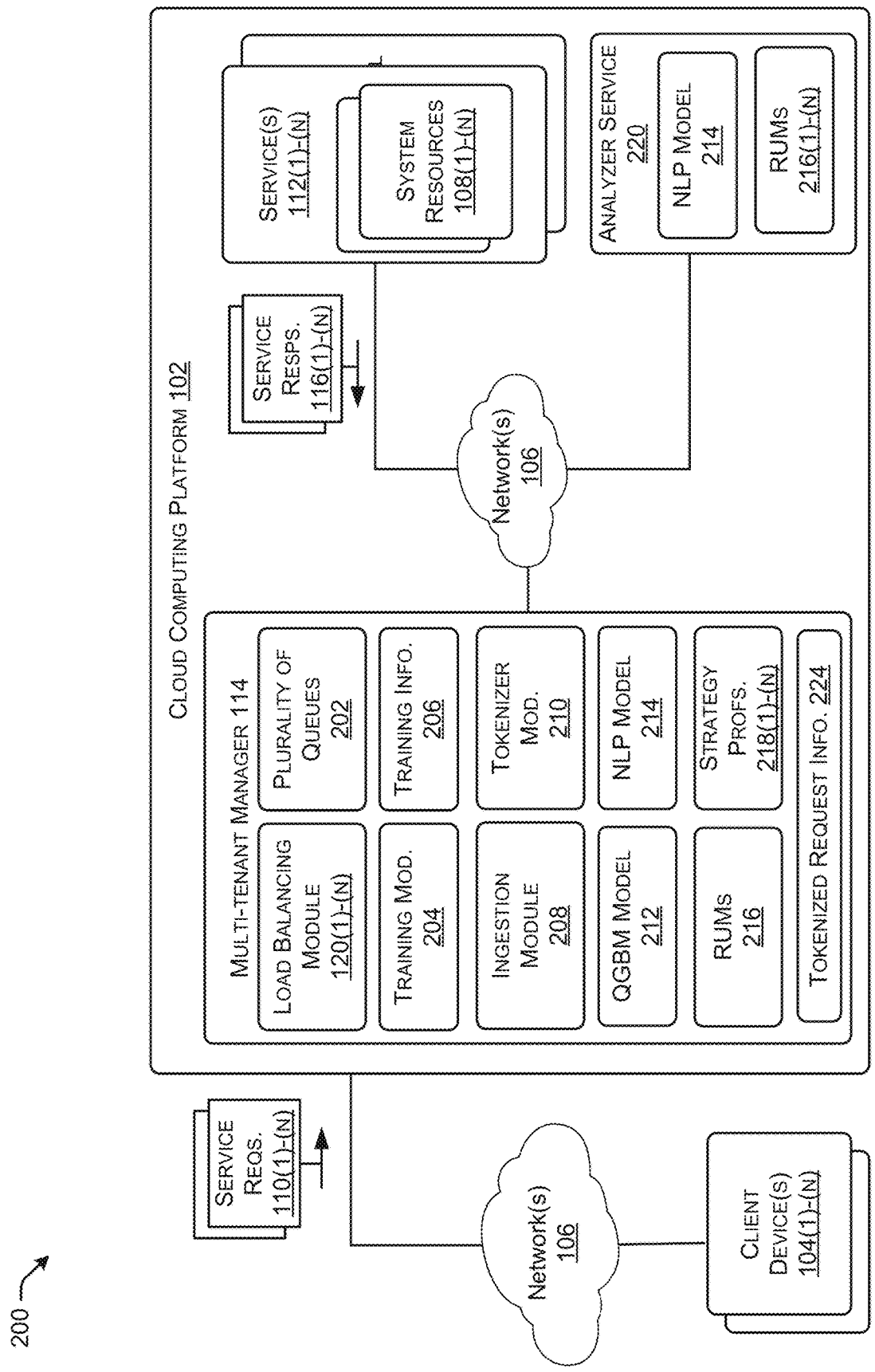
FIG. 2 illustrates an example architecture of a cloud computing system implementing resource governance in a multi-tenant system, in accordance with some aspects of the present disclosure.

FIG. 2 illustrates an example architecture of a cloud computing environment 200 implementing resource governance in a multi-tenant system, in accordance with some aspects of the present disclosure. As illustrated in FIG. 2, the multi-tenant manager 114 may include a load balancing module 120, a plurality of queues 202 for storing service requests 110 in accordance with a load balancing strategy, a training module 204, training information 206, an ingestion module 208, a tokenizer module 210, a quantile gradient boosting model (QGBM) 212, a natural language processing (NLP) model 214, one or more other resource utilization models (RUMs) 216, one or more strategy profiles 218(1)-(n), and an analyzer service 220.

As described in detail with respect to FIG. 1, the load balancing module 120 may receive the service requests 110(1)-(n) for the services 112(1)-(n) from the client device 104(1)-(n). Further, the load balancing module 120 may determine whether individual service requests 110(1)-(n) will be executed at a service 112 and when an individual service request 110 will be executed based on an individual load balancing strategies defined within the strategy profiles 218. In some aspects, a service request 110 may include a database command for a service 112 that implements a DaaS. For example, the service request 110 may include a database command, e.g., a database query, and the database command may include text in a query language or as free text. In some other aspects, the service request 110 may be a command, service call, function call, and/or request for a service 112 implementing another type of service. For example, the service request 110 may be a search request for a service 112 that implements a SEaaS, and the search request may include free text and/or search operators. As another example, the service request 110 may be a search request or file request for a service 112 that implements a STaaS, and the search request may include free text, search operators, regular expression commands, etc.

In addition, the multi-tenant manager 114 may transmit the service requests 110(1)-(n) to the services 112(1)-(n) in accordance with the load balancing strategies defined within the strategy profiles 218(1)-(n) and/or store service requests 110 within the plurality of queues 202 in accordance with the strategy profiles 218(1)-(n). Upon receipt of the services requests 110(1)-(n), the services may generate service responses 116(1)-(n), and transmit the services responses 116(1)-(n) to the client devices 104(1)-(n). In some aspects, the services 112(1)-(n) may transmit the service responses 116(1)-(n) to the client devices 104(1)-(n) via the multi-tenant manager 114.

The tokenizer module 210 may be configured to generate tokenized request information 224 based on a service request 110. In particular, the tokenizer module 210 may tokenize a service request 110 to generate corresponding tokenized request information 224. Further, the tokenizer module 210 may replace particular types of textual information within the service request 110 to generate the tokenized request information 224. For example, the tokenizer module 210 may replace string values, float values, datetime values, timestamp values, timespan values, integer values, variables, and ignore uninformative operators (e.g., "+", "=", ";", "|", etc.). In some aspects, the string values, the float values, the datetime values, and the timespan values may be replaced by standard tokens, e.g., the string "ABC" may be replaced with "[STRING]". Further, in some aspects, an integer may be replaced with a standard token that indicates number of digits in the integer, e.g., "1000" may be replaced with "[INTEGER4]". In some aspects, replacing the textual information from the service requests 110(1)-(n) allows the ML models to focus on non-client specific data when predicting RUV. For example, the tokenizer module 210 may remove names and system identifiers specific to a tenant which fail to inform the ML models (e.g., the QGBM model 212, the NLP model 214, etc.), and introduce noise while not having a consistent purpose or meaning across tenants. Additionally, in some examples, the tokenizer module 210 may be configured to embed timespan information and data volume information within the tokenized request information 224. Further, the tokenizer module 210 may be configured to generate ordered and unordered lists of tokens within tokenized request information 224.

The ingestion module 208 may be configured to monitor the volume of data and/or a number of objects associated with the different tenants within the multi-tenant environment of the cloud computing platform 102. For example, the ingestion module 208 may monitor the amount of data stored to the service 112(1) over a preconfigured period of time (e.g., seven days). Further, the ingestion module 208 may be configured to provide the amount of data stored for a particular tenant or the amount of data stored within one or more data tables associated with the tenant to a ML model (e.g., the QGBM model 212, the NLP model 214, the RUMs 216, etc.).

The training module 204 may be configured to generate, validate, and test the QGBM model 212, the NLP model 214, and/or RUMs 216. In some aspects, the training module 204 may validate and test the QGBM model 212 and/or the NLP model 214 on a tenant workspace basis. Further, the training module 204 be configured to train other ML models employed by multi-tenant manager 114 to predict a RUV value, i.e., the RUMs 216. For instance, the training module 204 may employ quantile regression when generating the QGBM model 212 to configure the QGBM model 212 to determine worst case predictions of RUV in order to prioritize predicting that a service request 110 that is actually non-expensive is expensive over predicting a service request 110 that is actually expensive is non-expensive. In some aspects, the training module may employ the following quantile regression loss function:

$$\rho_\tau(y, q_\tau) = \begin{cases} \tau \cdot |y - q_\tau| & y \geq q_\tau \\ (1-\tau) \cdot |y - q_\tau| & y < q_\tau \end{cases} \quad \text{(Equation 1)}$$

Where y and q are the label value(y) and the result prediction during training cycles(q) such that the difference is the loss, and τ controls the weight in the loss function of over predicting and under predicting with a bias that provides a higher penalty to under prediction, in order to tune the model to avoid, reduce, and/or minimize under prediction errors. Further, in some aspects, τ may be set to 0.9.

Further, the training module 204 may employ gradient boosting to generate the QGBM model 212. For example, the training module 204 may employ gradient boosting to iteratively identify and correct errors produced by the QGBM model 212 and weight the errors during correction according to a quantile loss function during the training phase (e.g., equation 1). In some examples the QGBM model 212 may be a decision tree ML model configured to predict the RUV, and/or a regression prediction ML model configured to predict the RUV.

Further, in some aspects, the QGBM model 212 may be trained to receive model input and output the logarithm of the RUV. In some aspects, the model input may include textual information of a service request 110 as tokenized request information 224, an amount of data associated with a tenant as provided by the ingestion module 208, and/or a temporal execution value indicating a timespan over which to execute the service request 110. Further, in some aspects, the text of the service request 110 may be free text or in a programming language, e.g., a query language. As described in detail herein, the QGBM model 212 may output the logarithm of the RUV. In some aspects, generating a logarithmic value may help overcome the increase in noise that may arise with query complexity by configuring the QGBM model 212 to penalize the percentage of an error (i.e., errors that are disproportional to the prediction).

In addition, the training module 204 may train the NLP model 214 as a neural network that implements a transformer architecture. In some aspects, the transformer architecture may apply self-attention to compute representations of model input and model output without using sequence-aligned recurrent neural network (RNN) or convolution. As used herein, "self-attention" may refer to an attention mechanism relating different positions of a single sequence in order to compute a representation of the sequence. For example, at each layer of the NLP model 214 may be configured to build a representation of each token as a combination of the representations of the tokens at the previous layer, thereby capturing the relationships between the terms of a service request 110. In particular, the NLP model 214 may determine n-gram information representing two or more tokens (e.g., bi-grams) within the tokenized request information 224.

Further, in some aspects, the NLP model 214 may be trained to receive model input and output the logarithm of the RUV. In some aspects, the model input include textual information of a service request 110 as tokenized request information 224. Further, an amount of data or number of objects associated with a tenant as provided by the ingestion module 208, and/or a temporal execution value indicating a timespan for the service request 110 may be embedded as tokens within the tokenized request information 224. For instance, the tokenizer module 210 may generate a first token corresponding to the amount of data associated with a service request 110 and a second token corresponding to the temporal execution value. Further, the first token and second token may be appended to the tokens generated for the textual information of the service request 110 within the tokenized request information 224. Additionally, in some aspects, the NLP model 214 may output the logarithm of the RUV to overcome the increase in noise that may arise with query complexity by configuring the NLP model 214 to penalize the percentage of an error.

As an example, the first layer of the NLP model 214 may compute an embedding matrix for the string properties of the service request 110 with a separator token inserted between values including textual information (e.g., a query string or search words), thereby transforming each token to an 8-dimensional vector, which may later be projected to a bigger 128-dimensional vector. Further, the NLP model 214 may add positional encoding to the 128-dimensional vector. In addition, another layer may compute an embedding matrix for the numerical properties, basically projecting the numerical features of the NLP model 214 to a 128-dimensional vector space treatment as another token in the input. Another separator token may then be inserted between the textual information tokens and the numerical features token to assist the NLP model 214 in distinguishing between textual features and the numerical features. Further, the NLP model 214 may add a single-layer or multi-layer transformer, extract the first vector that represents a concise representation of the request, and provide the first vector to a linear regression layer that predicts the RUV. In some aspects, the training module 204 may train the NLP model 214 with the mean squared error loss to inform the NLP model 214 of different impacts of each request property and/or free text operator on the RUV.

Further, the training module 204 may train the QGBM model 212 and the NLP model 214 using the training information 206. In some aspects, the training information 206 may include historic service request information. As an example, for previously-executed service requests 110, the training information 206 may include a request string (e.g., a query string), the related tenant workspace, an execution timestamp, a related client, and one or more actual resource utilization values each representing consumption of a system resource 108 by the previously-executed service request.

Further, the training information 206 may be intentionally selected to skew towards previously-executed service requests that resulted in higher RUVs in order to further configure the ML models (the QGBM model 212 and the NLP model 214) to predict the worst case scenarios. Further, in some aspects, the training module 204 may update or retrain the QGBM model 212 and the NLP model 214 using recently-collected training information 206.

Further, as described herein, once the QGBM model 212 and the NLP model 214 are trained and deployed within the multi-tenant manager 114, the load balancing module 120 may manage execution of the service requests 110(1)-(n). For example, the multi-tenant manager 114 may receive a service request 110(1) for a first service 112(1) from a client device 104(1), and the tokenizer module 210 may generate the tokenized request information 224. Further, the load balancing module 120 may provide the tokenized request information 224 to the QGBM model 212, and the QGBM model 212 may predict the RUV for the service request 110(1). In addition, the load balancing module 120 may determine the strategy for executing the service request 110(1) based on the RUV. In some aspects, the load balancing module 120 may delay execution of the service request 110(1) by adding the service request to a queue 202 based on the RUV in order to prevent service failure, service degradation, and/or costly and unnecessary auto-scaling. Additionally, in some aspects, the load balancing module 120 may monitor an amount of resource utilization of a resource for currently executing queries, and limit the application of a strategy to when the amount of resource utilization is greater than a preconfigured threshold.

As another example, the multi-tenant manager 114 may receive a service request 110(2) for a second service 112(2) from a client device 104(2), and the tokenizer module 210 may generate the tokenized request information 224. As described herein, the tokenized request information 224 may include a plurality of tokens representing the textual information of the service request 110(2), a first embedded token for the amount of data associated with the client device 104(2), and a second embedded token for the temporal execution value. Further, the load balancing module 120 may provide the tokenized request information 224 to the NLP model 214, and the NLP model 214 may predict the RUV for the service request 110(2). In addition, the load balancing module 120 may determine the load balancing strategy for executing the service request 110(2) based on the RUV. Further, in some examples, the cloud computing environment 200 may include the analyzer service 220 configured to receive textual information (e.g., the text of a service request 110) within a graphical user interface (GUI) and provide the RUV for the terms that have been entered into the GUI. Accordingly, a developer may use the analyzer service 220 to determine how individual terms of a service request 110 or the order of specific terms within the service request 110 affect the RUV of an intended request of a service 112. Further, in some aspects, the analyzer service 220 may employ the NLP model 214 to provide the real-time RUV values as the NLP model 214 may be configured to determine the RUV based on ordering via the transformer architecture.

Example Process

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the multi-tenant manager 114. By way of example and not limitation, the method 300 is described in the context of FIGS. 1-2 and 4. For example, the operations may be performed by one or more of the multi-tenant manager 114, the load balancing module 120, the training module 204, the ingestion module 208, the tokenizer module 210, the QGBM model 212, the NLP model 214, the RUMs 216, the one or more strategy profiles 218(1)-(n), and the analyzer service 220.

Figure 3:
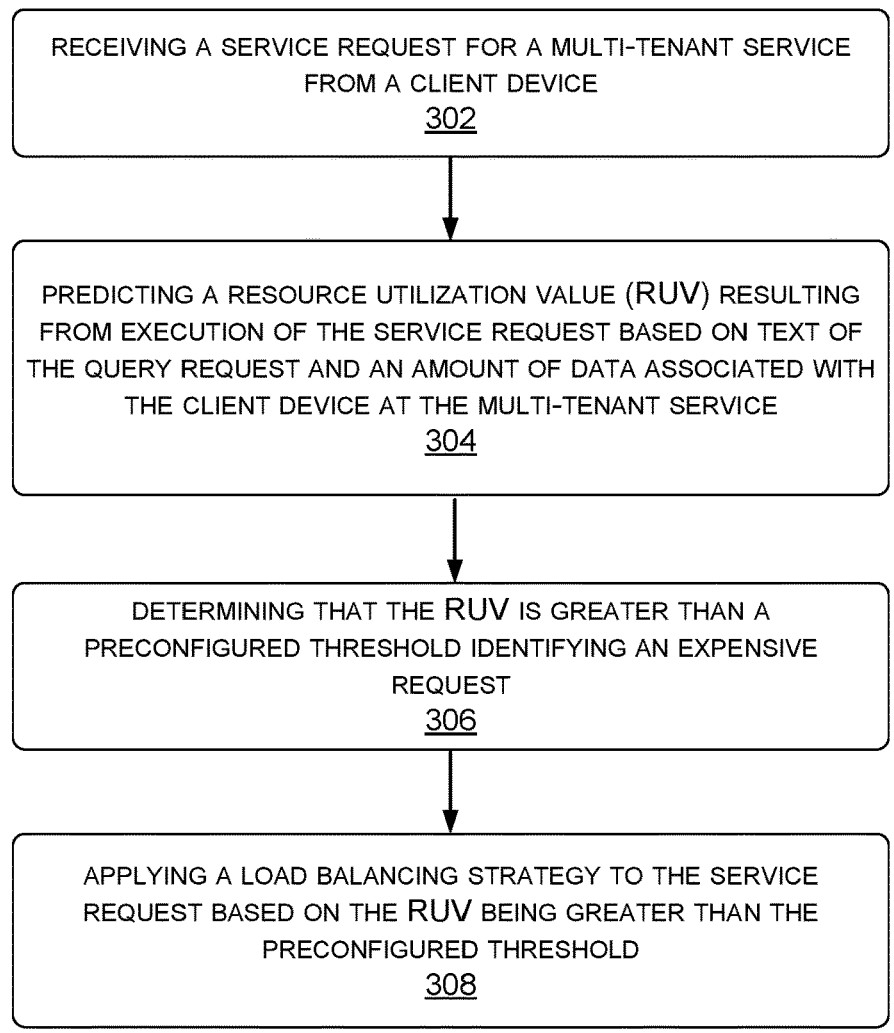
FIG. 3 is a flow diagram illustrating an example method for applying a load balancing strategy for executing a service request based on a RUV prediction, in accordance with some aspects of the present disclosure.

FIG. 3 is a flow diagram illustrating an example method 300 for applying a load balancing strategy for executing a service request based on a RUV prediction, in accordance with some aspects of the present disclosure.

At block 302, the method 300 may include receiving a service request for a multi-tenant service from a tenant device. For example, the multi-tenant manager 114 may receive the service request 110(1) from the client device 104(1). In some aspects, the service request 110(1) may be a database query for a DBaaS, a search query for a SEaaS, or a data request for a STaaS, etc.

Accordingly, the cloud computing platform 102, the cloud computing device 400, and/or the processor 402 executing the multi-tenant manager 114 may provide means for receiving a service request for a multi-tenant service from a client device.

At block 304, the method 300 may include predicting a resource utilization value (RUV) resulting from execution of the service request based on text of the service request, an amount of data associated with the tenant device at the multi-tenant service. For example, the load balancing module 120 may provide the tokenized request information 224 to a RUM (e.g., the QGBM model 212, the NLP model 214, etc.), and the RUM may predict the RUV for the service request 110(1) based on the tokenized request information 224. In some aspects, as described in detail herein, the tokenized request information 224 may include representations of the textual information of the service request 110(1) and an amount of data associated with the client device 104(1) and/or the service request 110(1). In some aspects, the tokenized request information 224 may further include a representation of a temporal execution value indicating a period of time over which to execute the service request 110(1). Further, the RUV may correspond to the utilization of at least one of system memory, one or more central processing units, or one or more I/O components Accordingly, the cloud computing platform 102, the cloud computing device 400, and/or the processor 402 executing the ML model 118, the QGBM model 212, or the NLP model 214 may provide means for predicting a resource utilization value (RUV) resulting from execution of the service request based on text of the service request, and an amount of data associated with the client device at the multi-tenant service.

At block 306, the method 300 may include determining that the RUV is greater than a preconfigured threshold identifying an expensive request. For example, the RUV may represent a prediction of a logarithmic value of an amount of the system resource 108(1) that will be consumed by performance of the service request 110(1), and the load balancing module 120 may determine that the RUV is greater than a preconfigured threshold identifying expensive requests. As another example, the RUV may represent a prediction of the total amount of the system resource 108(1) that will be consumed by performance of the service request 110(1) along with the currently executing service requests 110, and the load balancing module 120 may determine that the RUV is greater than a preconfigured threshold identifying an unsatisfactory level of consumption of the system resource 108(1) of the service 112(1). As yet still another example, the RUV may represent a prediction of the likelihood that the service request 110(1) will result in a timeout, and the load balancing module 120 may determine that the RUV is greater than a preconfigured threshold identifying an unsatisfactory likelihood of causing a timeout at the service 112(1).

Accordingly, the cloud computing platform 102, the cloud computing device 400, and/or the processor 402 executing the load balancing module 120 may provide means for determining that the RUV is greater than a preconfigured threshold identifying an expensive request.

At block 308, the method 300 may include applying a load balancing strategy to the service request based on the RUV being greater than the preconfigured threshold. For example, if the amount of expensive requests currently executing is less than a preconfigured threshold representing the maximum amount of expensive requests that are permitted concurrently execute, the load balancing module 120 may transmit the service request 110(1) to the service 112(1) for execution. Otherwise, the load balancing module 120 may add the service request 110(1) to the queue 202(1) to be transmitted to the service 112(1) for execution when the amount of expensive requests currently executing is less than the preconfigured threshold representing the maximum amount of expensive requests that are permitted concurrently execute.

Accordingly, the cloud computing platform 102, the cloud computing device 400, and/or the processor 402 executing the load balancing module 120 may provide means for applying a load balancing strategy to the service request based on the RUV being greater than the preconfigured threshold.

In additional aspect, in order to predict the RUV, the method 300 may include determining tokenized request information based on replacing one or more content types from the text of the query, and predicting, via a resource utilization model (RUM), the RUV based on the tokenized request information. For example, the tokenizer module 210 may generate the tokenized request information 224, and the ML model 118 (e.g., the QGBM model 212, the NLP model 214, or the RUMs 216) may predict the RUV based on the tokenized request information 224. Accordingly, the cloud computing platform 102, the cloud computing device 400, and/or the processor 402 executing the tokenizer module 210, the ML model 118, the QGBM model 212, and/or the NLP model 214 may provide means for applying a load balancing strategy to the service request based on the RUV being greater than the preconfigured threshold.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 4:
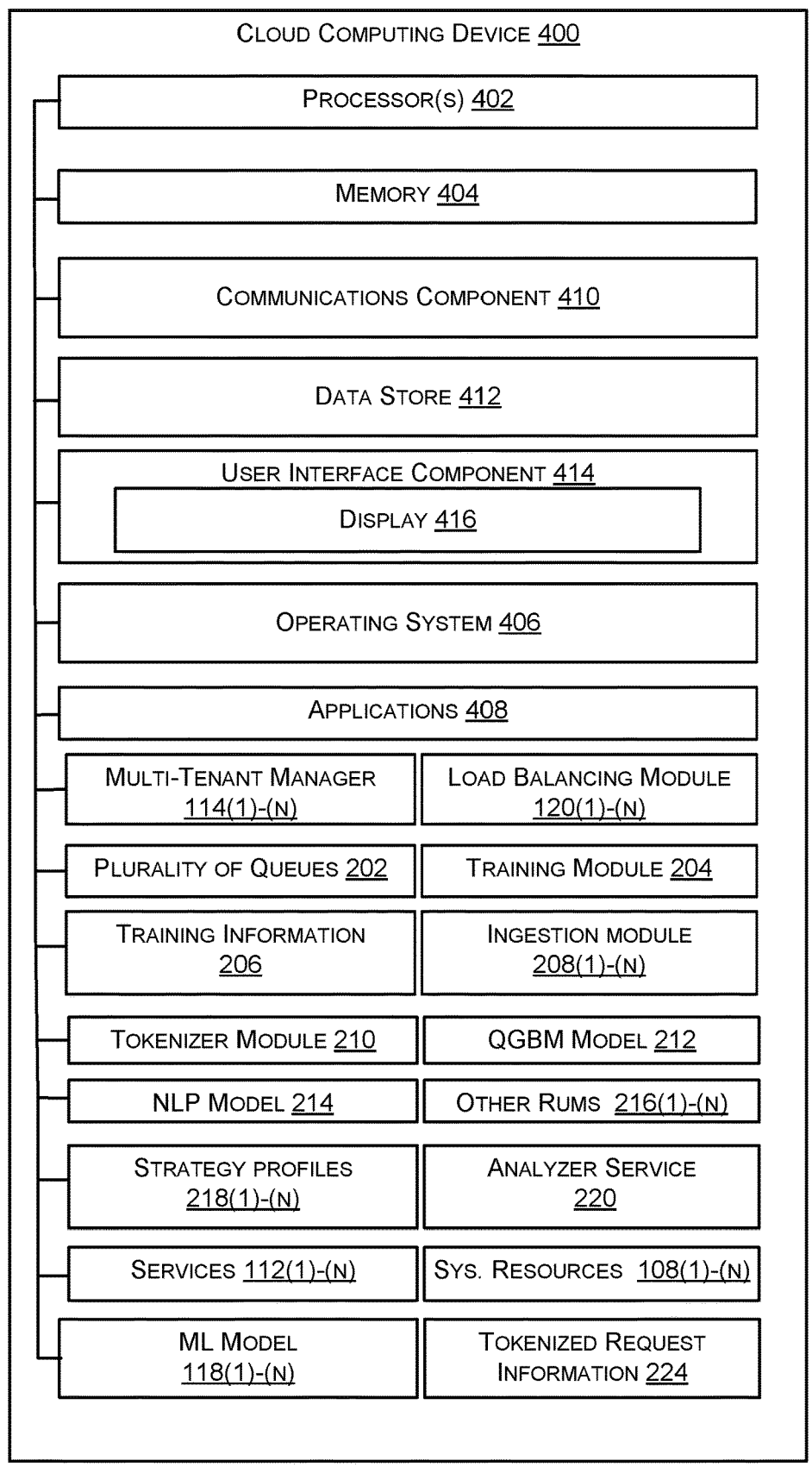
FIG. 4 is a block diagram illustrating an example of a hardware implementation for a cloud computing device(s), in accordance with some aspects of the present disclosure.

Referring now to FIG. 4, an example of a cloud computing device(s) 400 (e.g., cloud computing platform 102). In one example, the cloud computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the cloud computing device 400 also includes the memory 404 for storing instructions executable by the processor 402 for carrying out the functions described herein. The memory 404 may be configured for storing data and/or computer-executable instructions defining and/or associated with the operating system 406, the services 112, the multi-tenant manager 114, the ML model 118, the load balancing module 120, the queues 202(1)-(n), the training module 204, the training information 206, the ingestion module 208, the tokenizer module 210, the QGBM model 212, the NLP model 214, the other RUMs 216, the strategy profiles 218(1)-(n), the analyzer service 220, the tokenized request information 224(1)-(n), and the processor 402 may execute the operating system 406, the services 112, the multi-tenant manager 114, the ML model 118, the load balancing module 120, the training module 204, the ingestion module 208, the tokenizer module 210, the QGBM model 212, the NLP model 214, the other RUMs 216, and the analyzer service 220. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example cloud computing device 400 also includes a communications component 410 that provides for establishing and maintaining communications with one or more parties utilizing hardware, software, and services as described herein. The communications component 410 may carry communications between components on the cloud computing device 400, as well as between the cloud computing device 400 and external devices, such as devices located across a communications network and/or devices serially or locally connected to the cloud computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example cloud computing device 400 also includes a data store 412, which may be any suitable combination of hardware and/or software, that provides for mass storage of information, databases, and programs employed in connection with implementations described herein. For example, the data store 412 may be a data repository for the operating system 406 and/or the applications 408.

The example cloud computing device 400 also includes a user interface component 414 operable to receive inputs from a user of the cloud computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the services 112, the multi-tenant manager 114, the ML model 118, the load balancing module 120, the training module 204, the ingestion module 208, the tokenizer module 210, the QGBM model 212, the NLP model 214, the other RUMs 216, and the analyzer service 220, may be implemented in one or more of the processor 402, the applications 408, the operating system 406, and/or the user interface component 414 such that the subcomponents of the services 112, the multi-tenant manager 114, the ML model 118, the load balancing module 120, the training module 204, the ingestion module 208, the tokenizer module 210, the QGBM model 212, the NLP model 214, the other RUMs 216, and the analyzer service 220, are spread out between the components/subcomponents of the cloud computing device 400.

Conclusion

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

Example Clauses

A. A method comprising: receiving a service request for a multi-tenant service from a client device, predicting a resource utilization value (RUV) resulting from execution of the service request based on text of the service request and an amount of data associated with the client device at the multi-tenant service, determining that the RUV is greater than a preconfigured threshold identifying an expensive request, and apply a load balancing strategy to the service request based on the RUV being greater than the preconfigured threshold.

B. The method as paragraph A recites, predicting the resource utilization value comprises determining tokenized request information based on replacing one or more content types within the text of the service request, and predicting, via a resource utilization model (RUM), the RUV based on the tokenized request information.

C. The method as paragraph B recites, further comprising generating the RUM by applying quantile gradient boosting with a higher weight to under prediction of expensive requests.

D. The method as paragraph B recites, wherein the RUM is a natural language processing model that applies a transformer to the tokenized request information.

E. The method as paragraph D recites, further comprising determine n-gram information representing two or more tokens within the tokenized request information, determine a temporal token based on a temporal execution value, determine a data volume token based on the amount of data, and predict, via the RUM, the RUV based on the n-gram information, the temporal token, and the data volume token.

F. The method as any of paragraphs A-E recite, wherein the RUV is a log of a prediction of resource usage of executing the service request.

G. The method as paragraph F recites, wherein the preconfigured threshold is a first preconfigured threshold, and applying the load balancing strategy to the service request, comprises determining an amount of expensive requests currently executing over the multi-tenant resource, determining the amount of expensive requests is less than a second preconfigured threshold, and causing execution of the service request at the resource based on the amount of expensive requests being less than the second preconfigured threshold.

H. The method as paragraph F recites, wherein the preconfigured threshold is a first preconfigured threshold, and applying the load balancing strategy to the service request, comprises determining an amount of expensive requests currently executing over the multi-tenant resource, determining the amount of expensive requests is greater than or equal to a second preconfigured threshold, and adding the service request to a queue to be executed at a later time based on the amount of expensive requests being greater than or equal to the second preconfigured threshold.

I. The method as paragraph F recites, wherein the preconfigured threshold is a first preconfigured threshold, and applying the load balancing strategy to the service request, comprises determining an amount of expensive requests associated with a customer currently executing over the multi-tenant resource, determining the amount of expensive requests is greater than or equal to a second preconfigured threshold, and adding the service request to a queue to be executed at a later time based on the amount of expensive requests being greater than or equal to the second preconfigured threshold.

J. The method as any of paragraphs A-I recite, wherein the RUV is a prediction of total resource usage by one or more currently executing queries and the service request.

K. The method as any of paragraphs A-J recite, wherein the RUV is an estimation of a likelihood that the service request will result in a timeout.

L. The method as any of paragraphs A-K recite, wherein the RUV corresponds to at least one of memory usage, central processing unit (CPU) usage, or input/output (I/O) usage.

M. A multi-tenant manager device, comprising a memory storing computer-executable instructions; and at least one processor coupled with the memory and configured to execute the computer-executable instructions to perform the method of any of paragraphs A-L.

N. A multi-tenant manager device, comprising means for performing the method of any of paragraphs A-L.

O. A non-transitory computer-readable medium storing computer executable code, the code when executed by a processor causes the processor to perform the method of any of paragraphs A-L.

What is claimed is:

1. A multi-tenant manager device comprising:
   a memory storing instructions; and
   at least one processor coupled to the memory and configured to execute the instructions to:
   receive a service request for a multi-tenant service from a client device;
   determine tokenized request information based on replacing one or more content types within a text of the service request;
   predict, via a resource utilization model (RUM) and based on the tokenized request information, a resource utilization value (RUV) resulting from execution of the service request based on the text of the service request and an amount of data associated with the client device at the multi-tenant service, the RUV representing an amount of system resources of the multi-tenant manager device that will be consumed by performance of the service request, wherein the RUM is a natural language processing model that applies a transformer to the tokenized request information;
   determine that the RUV is greater than a preconfigured threshold identifying an expensive request; and
   apply a load balancing strategy to the service request based on the RUV being greater than the preconfigured threshold.

2. The multi-tenant manager device of claim 1, wherein the at least one processor is configured to generate the RUM by applying quantile gradient boosting with a higher weight to under prediction of expensive requests.

3. The multi-tenant manager device of claim 1, wherein the at least one processor is further configured to:
   determine n-gram information representing two or more tokens within the tokenized request information;
   determine a temporal token based on a temporal execution value;
   determine a data volume token based on the amount of data; and
   predict, via the RUM, the RUV based on the n-gram information, the temporal token, and the data volume token.

4. The multi-tenant manager device of claim 1, wherein the RUV is a log of a prediction of resource usage of executing the service request.

5. The multi-tenant manager device of claim 4, wherein the preconfigured threshold is a first preconfigured threshold, and to apply the load balancing strategy to the service request, and the at least one processor is configured to:
   determine an amount of expensive requests currently executing over the multi-tenant resource;
   determine the amount of expensive requests is less than a second preconfigured threshold; and
   cause execution of the service request at the resource based on the amount of expensive requests being less than the second preconfigured threshold.

6. The multi-tenant manager device of claim 4, wherein the preconfigured threshold is a first preconfigured threshold, and to apply the load balancing strategy to the service request, and the at least one processor is configured to:
   determine an amount of expensive requests currently executing over the multi-tenant resource;
   determine the amount of expensive requests is greater than or equal to a second preconfigured threshold; and
   add the service request to a queue to be executed at a later time based on the amount of expensive requests being greater than or equal to the second preconfigured threshold.

7. The multi-tenant manager device of claim 4, wherein the preconfigured threshold is a first preconfigured threshold, and to apply the load balancing strategy to the service request, and the at least one processor is further configured to:
   determine an amount of expensive requests associated with a customer currently executing over the multi-tenant resource;
   determine the amount of expensive requests is greater than or equal to a second preconfigured threshold; and
   add the service request to a queue to be executed at a later time based on the amount of expensive requests being greater than or equal to the second preconfigured threshold.

8. The multi-tenant manager device of claim 1, wherein the RUV is a prediction of total resource usage by one or more currently executing queries and the service request.

9. The multi-tenant manager device of claim 1, wherein the RUV is an estimation of a likelihood that the service request will result in a timeout.

10. The multi-tenant manager device of claim 1, wherein the RUV corresponds to at least one of memory usage, central processing unit (CPU) usage, or input/output (I/O) usage.

11. A method comprising:
    receiving a service request for a multi-tenant service from a client device;
    determine tokenized request information based on replacing one or more content types within a text of the service request;
    predicting, via a resource utilization model (RUM) and based on the tokenized request information, a resource utilization value (RUV) resulting from execution of the service request based on the text of the service request and an amount of data associated with the client device at the multi-tenant service, the RUV representing an amount of system resources of the multi-tenant manager device that will be consumed by performance of the service request, wherein the RUM is a natural language processing model that applies a transformer to the tokenized request information;

determining that the RUV is greater than a preconfigured threshold identifying an expensive request; and applying a load balancing strategy to the service request based on the RUV being greater than the preconfigured threshold.

12. The method of claim 11, further comprising:

generating the RUM by applying quantile gradient boosting with a higher weight to under prediction of expensive requests.

13. The method of claim 11, wherein the RUV is a log of a prediction of resource usage of executing the service request.

14. The method of claim 11, further comprising:

determining n-gram information representing two or more tokens within the tokenized request information;

determining a temporal token based on a temporal execution value;

determining a data volume token based on the amount of data; and predicting, via the RUM, the RUV based on the n-gram information, the temporal token, and the data volume token.

15. The method of claim 11, further comprising:

determining an amount of expensive requests currently executing over the multi-tenant resource;

determining the amount of expensive requests is less than a second preconfigured threshold; and causing execution of the service request at the resource based on the amount of expensive requests being less than the second preconfigured threshold.

16. The method of claim 11, further comprising:

determine an amount of expensive requests currently executing over the multi-tenant resource;

determine the amount of expensive requests is greater than or equal to a second preconfigured threshold; and add the service request to a queue to be executed at a later time based on the amount of expensive requests being greater than or equal to the second preconfigured threshold.

17. The method of claim 11, further comprising:

determine an amount of expensive requests associated with a customer currently executing over the multi-tenant resource;

determine the amount of expensive requests is greater than or equal to a second preconfigured threshold; and add the service request to a queue to be executed at a later time based on the amount of expensive requests being greater than or equal to the second preconfigured threshold.

18. The method of claim 11, wherein the RUV is a prediction of total resource usage by one or more currently executing queries and the service request.

19. A non-transitory computer-readable device storing instructions thereon that, when executed by at least one computing device, causes the at least one computing device to perform operations comprising:

receiving a service request for a multi-tenant service from a client device;

determine tokenized request information based on replacing one or more content types within a text of the service request;

predicting, via a resource utilization model (RUM) and based on the tokenized request information, a resource utilization value (RUV) resulting from execution of the service request based on the text of the service request and an amount of data associated with the client device at the multi-tenant service, the RUV representing an amount of system resources of the multi-tenant manager device that will be consumed by performance of the service request, wherein the RUM is a natural language processing model that applies a transformer to the tokenized request information;

determining that the RUV is greater than a preconfigured threshold identifying an expensive request; and applying a load balancing strategy to the service request based on the RUV being greater than the preconfigured threshold.

20. The non-transitory computer-readable device of claim 19, wherein the RUV corresponds to at least one of memory usage, central processing unit (CPU) usage, or input/output (I/O) usage.

* * * * *